(12) United States Patent
Yang

(10) Patent No.: US 9,125,186 B2
(45) Date of Patent: Sep. 1, 2015

(54) WI-FI ACCESS POINT AND SYSTEM FOR ESTABLISHING DATA TRANSMISSION CHANNEL

(71) Applicant: Quanta Computer Inc., Kuei Shan Hsiang, Tao Yuan Shien (TW)

(72) Inventor: Bor-Wen Yang, Tao Yuan Shien (TW)

(73) Assignee: QUANTA COMPUTER INC., Guishan Dist, Taoyuan (TW)

( * ) Notice: Subject to any disclaimer, the term of this patent is extended or adjusted under 35 U.S.C. 154(b) by 313 days.

(21) Appl. No.: 13/872,323

(22) Filed: Apr. 29, 2013

(65) Prior Publication Data

US 2014/0086163 A1    Mar. 27, 2014

(30) Foreign Application Priority Data

Sep. 24, 2012   (TW) .............................. 101134868 A

(51) Int. Cl.
| | |
|---|---|
| *H04W 76/02* | (2009.01) |
| *H04W 84/04* | (2009.01) |
| *H04W 72/04* | (2009.01) |
| *H04W 12/04* | (2009.01) |
| *H04W 88/10* | (2009.01) |
| *H04L 29/06* | (2006.01) |
| *H04W 12/06* | (2009.01) |
| *H04W 84/12* | (2009.01) |

(52) U.S. Cl.
CPC .............. *H04W 72/04* (2013.01); *H04W 12/04* (2013.01); *H04W 76/02* (2013.01); *H04L 63/18* (2013.01); *H04W 12/06* (2013.01); *H04W 84/045* (2013.01); *H04W 84/12* (2013.01); *H04W 88/10* (2013.01); *Y02B 60/50* (2013.01)

(58) Field of Classification Search
None
See application file for complete search history.

(56) References Cited

U.S. PATENT DOCUMENTS

| | | | | |
|---|---|---|---|---|
| 2011/0075675 | A1* | 3/2011 | Koodli et al. | 370/401 |
| 2013/0100944 | A1* | 4/2013 | Kwon et al. | 370/338 |
| 2013/0137423 | A1* | 5/2013 | Das et al. | 455/426.1 |
| 2013/0155170 | A1* | 6/2013 | Eichen et al. | 348/14.02 |
| 2014/0362807 | A1* | 12/2014 | Bhatnagar et al. | 370/329 |

* cited by examiner

*Primary Examiner* — Hoon J Chung
(74) *Attorney, Agent, or Firm* — McClure, Qualey & Rodack, LLP

(57) ABSTRACT

A Wi-Fi access point (AP) is provided. The Wi-Fi AP includes a femtocell signaling interface, a WAN interface, a Wi-Fi AP radio access interface, and a controller sub-system. The controller sub-system connects with a user equipment through the femtocell signaling interface, and connects with a CN through the WAN interface. The controller sub-system performs a first security establishment with the user equipment, and performs a second security establishment with the cellular core network. The controller sub-system obtains security parameters according to the first security establishment and the second security establishment. The controller sub-system performs a first Wi-Fi bearer setup procedure and a second Wi-Fi bearer setup procedure with the user equipment and the cellular core network. The controller sub-system performs a security information exchange procedure with a Wi-Fi AP radio access interface. The controller sub-system establishes a data transmission channel with the UE according to the security parameters.

13 Claims, 8 Drawing Sheets

US 9,125,186 B2

WI-FI ACCESS POINT AND SYSTEM FOR ESTABLISHING DATA TRANSMISSION CHANNEL

CROSS REFERENCE TO RELATED APPLICATIONS

The present application is based on, and claims priority from, Taiwan (International) Application Serial Number 101134868, filed on Sep. 24, 2012, the invention of which is hereby incorporated by reference herein in its entirety.

TECHNICAL FIELD

The present invention relates to an access point and a system for establishing a data transmission channel, and in particular to a Wi-Fi access point and a system for establishing a data transmission channel.

BACKGROUND

"Femtocell" is a small cellular base station, which can be provided by a network service provider or others. The femtocell can be used to establish a part of a cellular network. The femtocell is usually installed in an area with a relatively small range, for example, an office building, a house, a subway terminal, etc, to provide an enhanced communication range. Unlike conventional cellular base stations, a user can construct the femtocell by himself.

The user equipment (UE) may perform data transmission with a Wi-Fi access point and internet through the femtocell. However, the conventional femtocell has a femtocell signaling interface and a user data transmission interface, wherein the user data transmission interface may cause a problem such that the production cost becomes expensive.

Therefore, a Wi-Fi access point and a system for establishing a data transmission channel are provided to solve the problem, and may achieve a much more efficient utilization.

SUMMARY

A detailed description is given in the following embodiments with reference to the accompanying drawings.

An access point and a system for establishing a data transmission channel are provided.

In one exemplary embodiment, the invention is directed to a Wi-Fi access point (Wi-Fi AP), comprising: a femtocell signaling interface; a wide area network (WAN) interface; a Wi-Fi access point radio access interface; and a controller sub-system, coupled to the femtocell signaling interface, the wide area network interface, and the Wi-Fi AP radio access interface; wherein the controller sub-system performs a first connection establishment procedure with a user equipment through the femtocell signaling interface, and a second connection establishment procedure with a cellular core network (CN) through the wide area network interface; the controller sub-system performs a first security establishment procedure with the user equipment through the femtocell signaling interface, and a second security establishment procedure with the cellular core network by using the wide area network interface; the controller sub-system obtains a set of security parameters according to the first security establishment and the second security establishment; the controller sub-system further performs a first Wi-Fi bearer setup procedure and a second Wi-Fi bearer setup procedure with the user equipment and the cellular core network through the femtocell signaling interface and the wide area network interface, respectively; the controller sub-system performs a security information exchange procedure with the Wi-Fi access point radio access interface through the femtocell signaling interface; and the controller sub-system establishes a data transmission channel with the user equipment through the Wi-Fi access point radio access interface according to the set of security parameters.

In one exemplary embodiment, the invention is directed to A system of Wi-Fi access points (Wi-Fi AP), comprising: a Wi-Fi access point, comprising: a femtocell signaling interface; a wide area network (WAN) interface; a first local area network (LAN) interface; a Wi-Fi access point radio access interface; a first controller sub-system, coupled to the femtocell signaling interface, the wide area network interface, the first local area network interface and the Wi-Fi access point radio access interface; and a Wi-Fi access point partner, coupled to the Wi-Fi access point through a network interface, comprising: a Wi-Fi access point radio sub-system; a second local area network (LAN) interface; a femtocell signaling partner, configured to establish a partnership relation between the Wi-Fi access point and the Wi-Fi access point partner; a second controller sub-system, coupled to the local area network interface and the femtocell signaling partner; wherein the first controller sub-system performs a first connection establishment procedure with the user equipment through the femtocell signaling interface, and performs a second connection establishment procedure with a cellular core network (CN) through the wide area network interface; the first controller sub-system performs a first security establishment with the user equipment through the femtocell signaling interface, and performs a second security establishment with the cellular core network through the wide area network interface; the controller sub-system obtains a set of security parameters according to the first security establishment and the second security establishment; the first controller sub-system performs a security information exchange procedure with the second controller sub-system through the first local area network interface; and the second controller sub-system establishes a data transmission channel with the user equipment through the Wi-Fi access point radio sub-system according to the set of security parameters.

DRAWINGS

The present invention can be more fully understood by reading the subsequent detailed description and examples with references made to the accompanying drawings, wherein.

Figure 3:
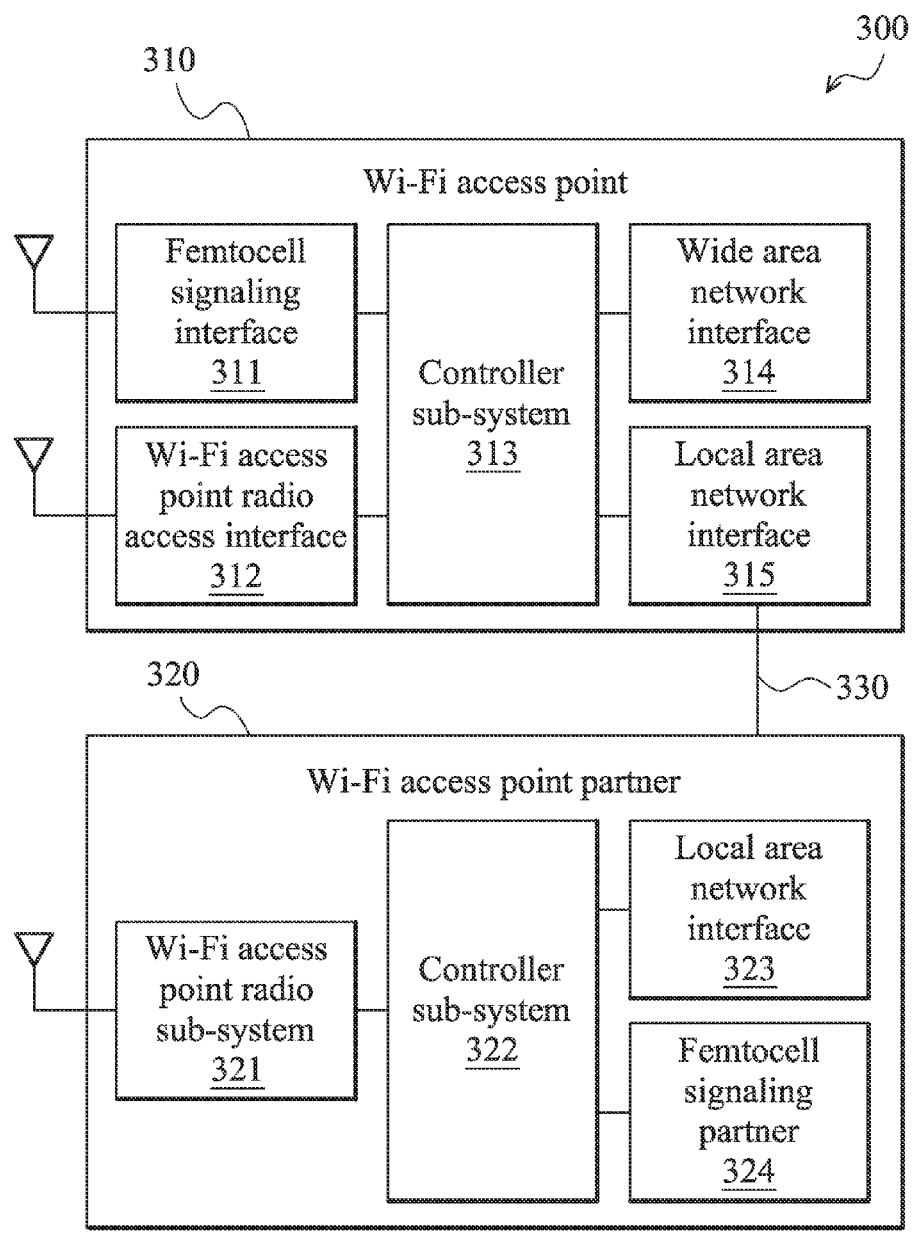
FIG. 3 is a schematic diagram of a system of Wi-Fi access points according to an embodiment of the present invention.
Figure 7:
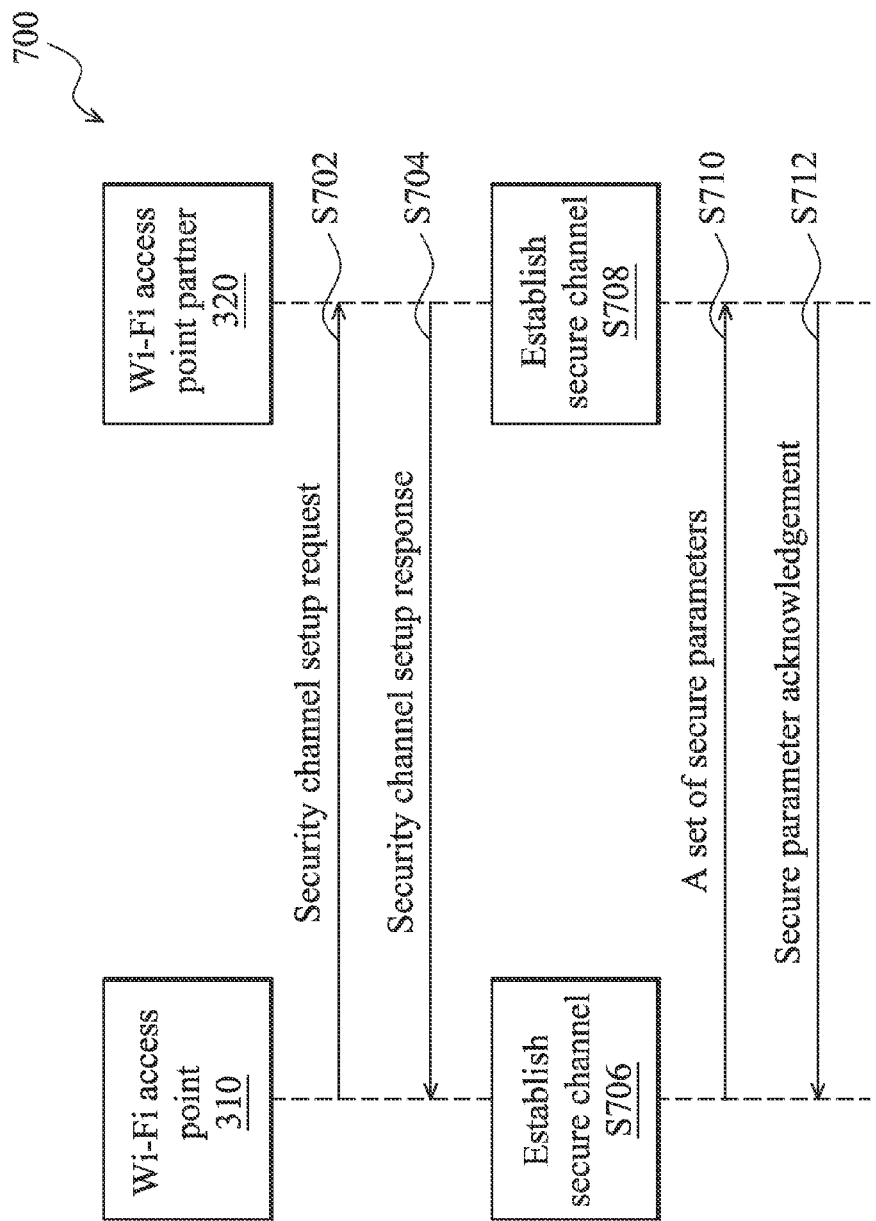
Figure 8:
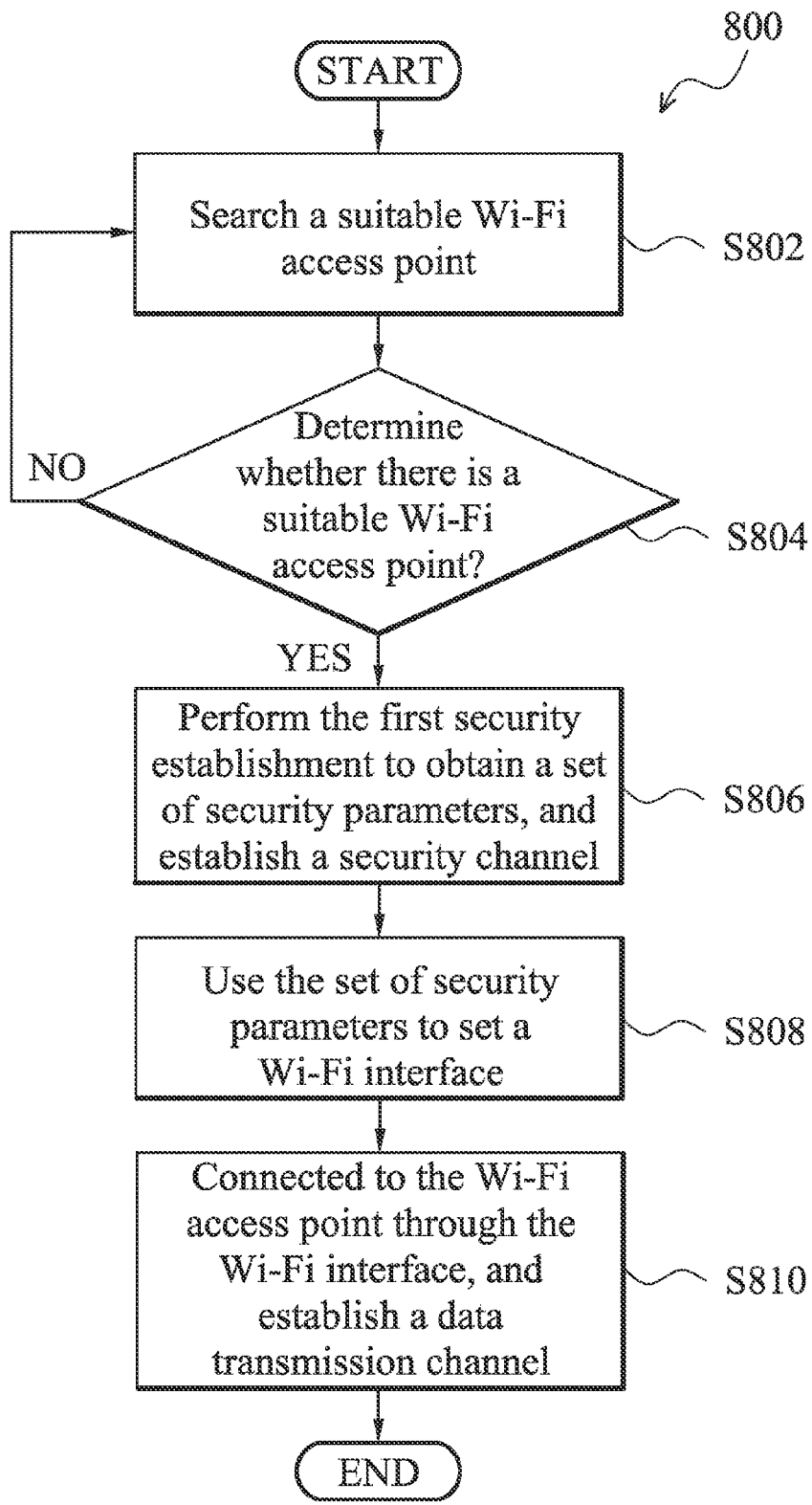

FIG. 7 is a flow diagram illustrating that the Wi-Fi access point and the Wi-Fi access point partner of FIG. 3 perform the security information exchange procedure according to an embodiment of the present invention; and FIG. 8 is a flow diagram illustrating that the user equipment entity is connected to the Wi-Fi access point to establish a data transmission channel according to an embodiment of the present invention.

DETAILED DESCRIPTION

Several exemplary embodiments of the application are described with reference to FIGS. 1 through 8, which generally relate to an access point and a system for establishing a data transmission channel. It is to be understood that the following invention provides various different embodiments as examples for implementing different features of the application. Specific examples of components and arrangements are described in the following to simplify the present invention. These are, of course, merely examples and are not intended to be limiting. In addition, the present invention may repeat reference numerals and/or letters in the various examples. This repetition is for the purpose of simplicity and clarity and does not in itself dictate a relationship between the various described embodiments and/or configurations.

Embodiments described below illustrate an access point and a system for establishing a data transmission channel of the present invention.

Figure 1:
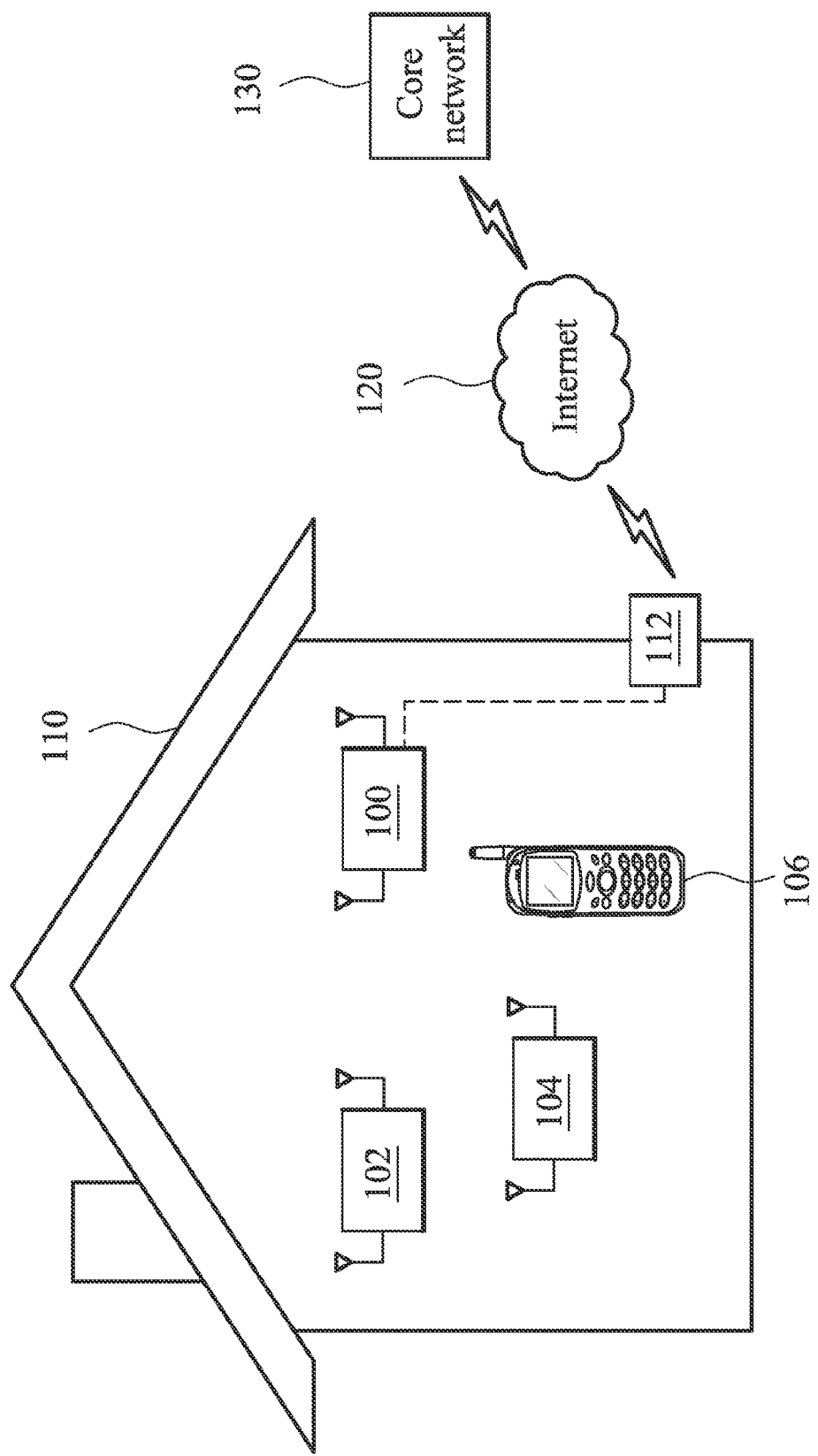
FIG. 1 is a schematic diagram of a Wi-Fi access point (AP) according to an embodiment of the present invention.

FIG. 1 is a schematic diagram of a Wi-Fi access point (AP) 100 according to an embodiment of the present invention. As shown in FIG. 1, a Wi-Fi access point 100 is installed in a premise 110, and is connected to a network access device 112, such as a gateway or a modem. A Wi-Fi access point 100 is connected to a cellular core network 130 through an internet 120.

According to the embodiment of the present invention, when the space of the premise 110 is large, other Wi-Fi access point partners, such as the Wi-Fi access point partners 102 and 104, can be installed on the premise 110. The user equipment (UE) 106 may establish a connection with the internet 120 by using the Wi-Fi access point 100, and the Wi-Fi access point partners 102 and 104.

Figure 2:
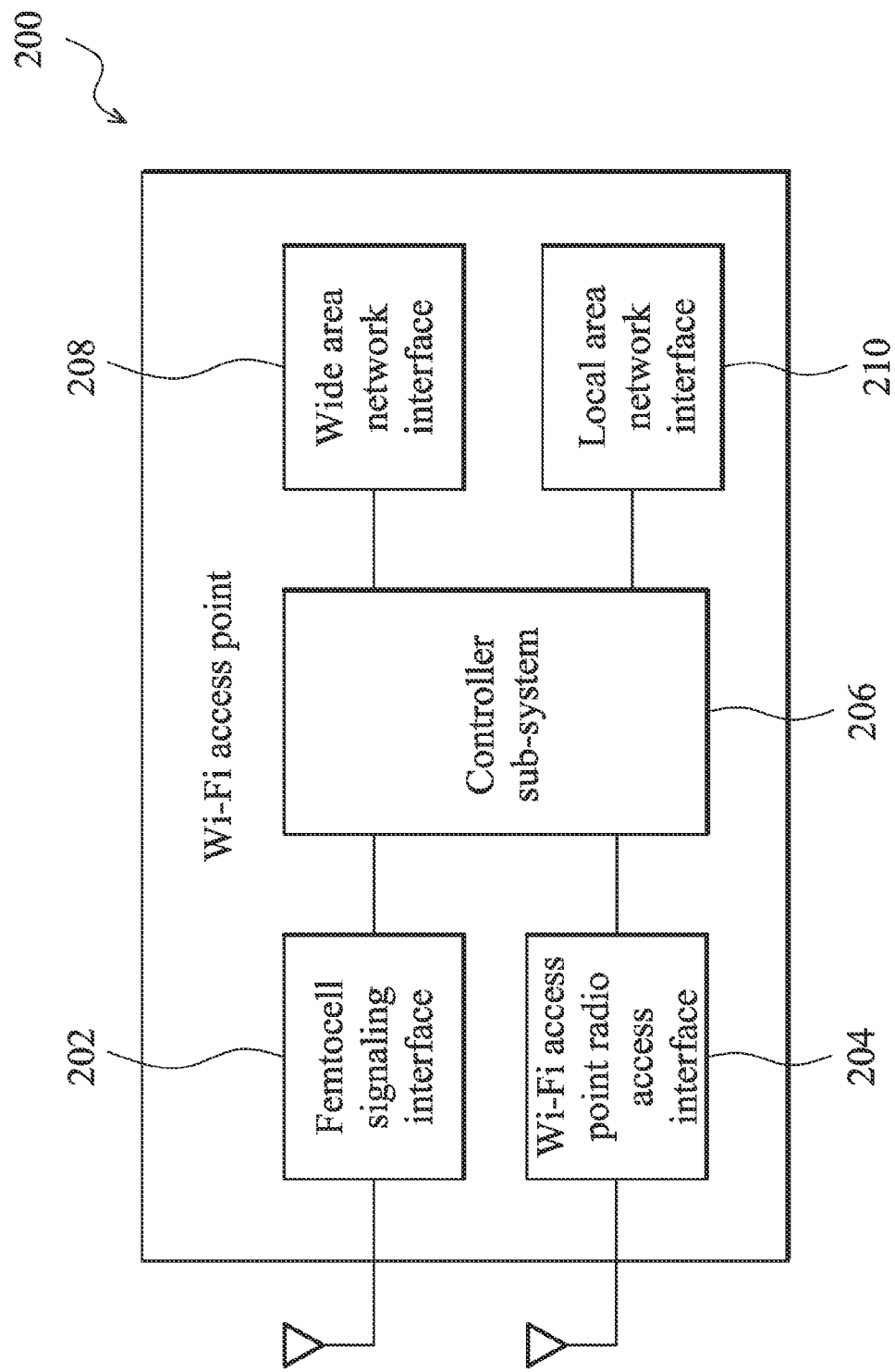
FIG. 2 is a schematic diagram of a Wi-Fi access point according to an embodiment of the present invention.

FIG. 2 is a schematic diagram of a Wi-Fi access point 200 according to an embodiment of the present invention. The Wi-Fi access point 200 can be the Wi-Fi access point 100 in FIG. 1.

The Wi-Fi access point 200 comprises a femtocell signaling interface 202, a Wi-Fi access point radio access interface 204, a controller sub-system 206, a wide area network (WAN) interface 208 and a local area network (LAN) interface 210. The controller sub-system 206 is coupled to the femtocell signaling interface 202, the Wi-Fi access point radio access interface 204, the wide area network interface 208 and the local area network interface 210, respectively. It is worth noting that the Wi-Fi access point 200 may include a plurality of Wi-Fi access point radio access interfaces 204, or may not include any Wi-Fi access point radio access interface 204 in some embodiments. The number of Wi-Fi access interfaces 204 may be increased or decreased and are not limited to the invention.

The femtocell signaling interface 202 may comprise suitable logic, circuitry and/or code which implements the signaling portion of one or more cellular femtocell specifications which may be the 3GPP (3rd Generation Partnership Project), 3GPP2 (3rd Generation Partnership Project 2), WiMAX/802.16, IMT-2000 (International Mobile Telecommunications—2000) and IMT-Advanced (International Mobile Telecommunications—Advanced)-related standards. It is worth noting that the femtocell signaling interface 202 is different from a traditional femtocell radio interface. The femtocell signaling interface 202 in the invention is merely a signaling interface which implements a control plane of the femtocell protocol stacks.

User plane data transmission would be performed by the access point radio access interface 204. The Wi-Fi access point radio access interface 204 may comprise suitable logic, circuitry and/or code which work as an access point in 802.11/Wi-Fi wireless local area network. In another embodiment, the Wi-Fi access point radio access interface 204 may comply with 802.11a, 802.11b, 802.11g, 802.11n, 802.11ac and/or 802.11ad specifications.

The controller sub-system 206 may comprise suitable logic, circuitry and/or code. The controller sub-system 206 may include one or several micro-processors, digital signal processors (DSPs), memory (volatile and non-volatile types), and suitable input/output facilities. The controller sub-system 206 may coordinate and control the packet (including data packets and signaling packets) exchange between the front-end interfaces (the femtocell signaling interface 202 and the Wi-Fi access point radio access interface 204) and backend interfaces (the wide area network interface 208 and the local area network interface 210).

The wide area network interface 208 may comprise suitable logic, circuitry and/or code, and is used to connect the Wi-Fi access point 200 to the cellular core network. In various embodiments, the wide area network interface 208 may be realized with 802.3/Ethernet interface, cable modem interface, HomePlug/HomePNA, fiber-optics G-PON/E-PON interface, and/or ADSL/HDSL/VDSL backend interface.

The local area network interface 210 may comprise suitable logic, circuitry and/or code. The local area network interface 210 is used to connect the Wi-Fi access point 200 to the local area network in which the Wi-Fi access point 200 is located. The local area network interface 210 is also the interface to connect to data terminals (DTs).

FIG. 3 is a schematic diagram of a system 300 of Wi-Fi access points according to an embodiment of the present invention with reference to FIG. 1.

As shown in FIG. 3, the Wi-Fi access point system 300 includes a Wi-Fi access point 310 and a Wi-Fi access point partner 320. The Wi-Fi access point 310 and the Wi-Fi access point partner 320 are connected with each other through a network interface 330. The Wi-Fi access point 310 includes a femtocell signaling interface 311, a Wi-Fi access point radio access interface 312, a controller sub-system 313, a wide area network (WAN) interface 314 and a local area network (LAN) interface 315. The controller sub-system 313 is coupled to the femtocell signaling interface 311, the Wi-Fi access point radio access interface 312, the wide area network interface 314, and the local area network interface 315, respectively. The related technologies of the components in the Wi-Fi access point 310 are the same as the illustration of the embodiment described above, so the details related to the technologies of the system will be omitted.

The Wi-Fi access point partner 320 can be the Wi-Fi access point partners 102 and 104 shown in FIG. 1. The Wi-Fi access point partner 320 includes a Wi-Fi access point radio sub-system 321, a controller sub-system 322, a local area network (LAN) interface 323 and a femtocell signaling partner 324. The controller sub-system 322 is coupled to the Wi-Fi access point radio sub-system 321, the local area network interface 323, and the femtocell signaling partner 324, respectively. Components in the Wi-Fi access point 310 having the same name as described in the above embodiment have the same function, so the details related to the functions of the components will be omitted.

In the embodiment, the femtocell signaling partner 324 may comprise suitable logic, circuitry and/or code, and may also be realized by software program. The femtocell signaling partner 324 can establish a partnership relation between the Wi-Fi access point 310 and the Wi-Fi access point partner 320, and may also establish the partnership relation with a discovery protocol dynamically. It is worth noting that after the partnership relation had been established, the Wi-Fi access point partner 320 can work as the Wi-Fi access point radio access interface 312. In addition, after establishing the partnership relation, both the Wi-Fi access point 310 and the Wi-Fi access point partner 320 monitor the network interface 330 to ensure the device on the other end of the connection works well. In the embodiment of the present invention, the connection between the Wi-Fi access point 310 and the Wi-Fi access point partner 320 may be encrypted or not be encrypted. The femtocell signaling partner 324 further forwards the user data packets between the Wi-Fi access point radio sub-system 321 and the Wi-Fi access point 310 through the network interface 330.

Figure 4:
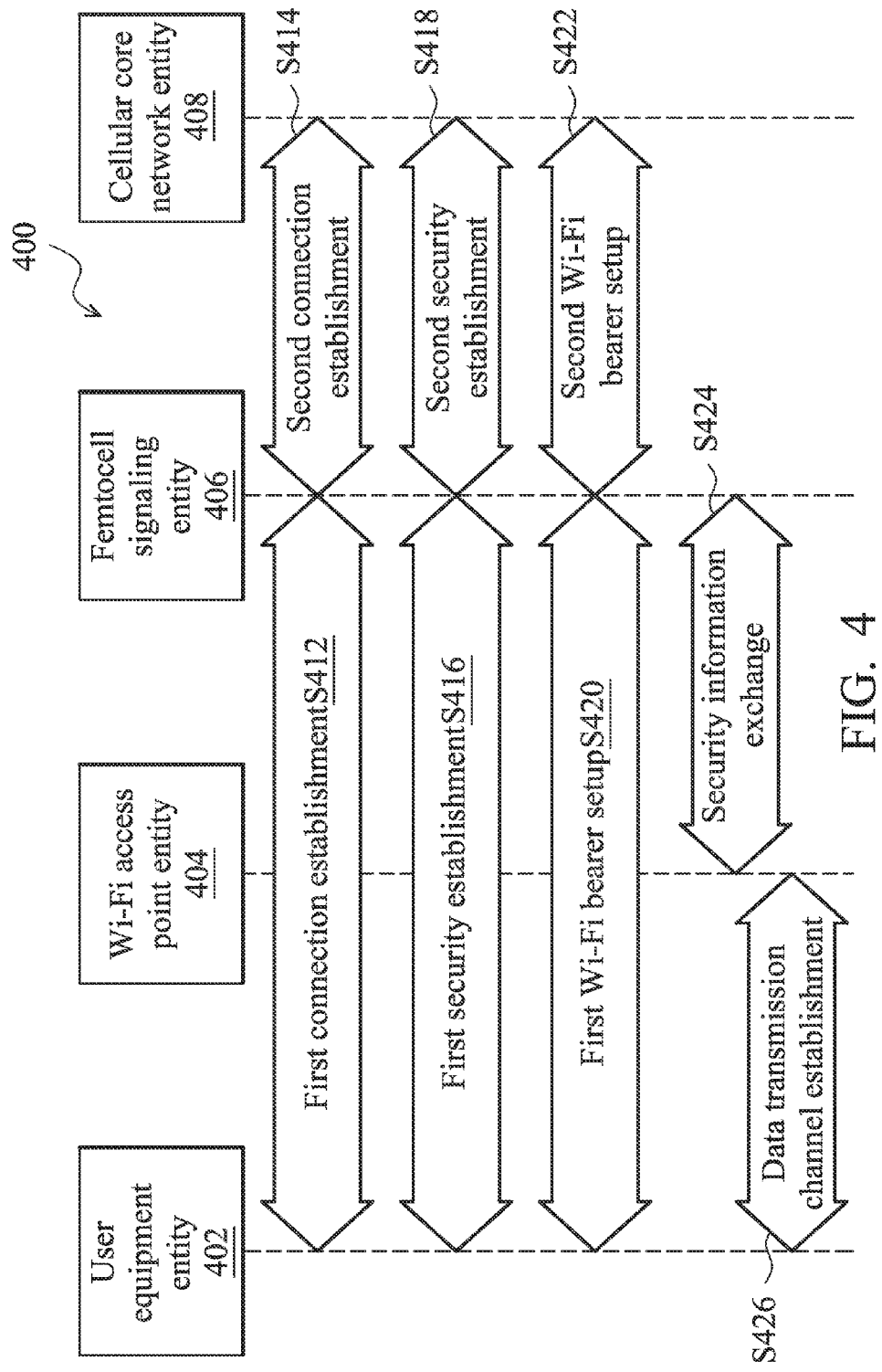
FIG. 4 is a flow diagram illustrating that the user equipment connects with the cellular core network through the Wi-Fi access point according to an embodiment of the present invention.

FIG. 4 is a flow diagram 400 illustrating that the user equipment connects with the cellular core network through the Wi-Fi access point according to an embodiment of the present invention with reference to FIG. 2 and FIG. 3. The flow diagram 400 includes a user equipment entity 402 which may be used to transmit or receive a request to transfer data, a Wi-Fi access point entity 404, a femtocell signaling entity 406 and a cellular core network entity 408, wherein the user equipment entity 402 may be a mobile device with a cellular network interface and Wi-Fi/802.11 interface. For example it can be, but is not limited to, a 3GPP 3G cellular phone with Wi-Fi 11g interface, or a tablet with both LTE interface and Wi-Fi 11n interfaces. The Wi-Fi access point entity 404 may represent the Wi-Fi access point radio access interface 204 of FIG. 2 or the Wi-Fi access point partner 320 of FIG. 3. The femtocell signaling entity 406 represents the combination entity of the femtocell signaling interface 202, the controller sub-system 206, and the wide area network interface 208 of FIG. 2. The cellular core network entity 408 represents the cellular core network of the cellular telecommunication system. For example, the cellular core network entity 408 may be, but is not limited to, a 3GPP Evolved Packet Core (EPC) network, 3GPP 3G core network, WiMAX core network or 3GPP2/CDMA cellular core network.

First, in step S412, the user equipment entity 402 performs a first connection establishment procedure with the femtocell signaling entity 406. In detail, the controller sub-system of the femtocell signaling entity 406 performs the first connection establishment procedure with the user equipment entity 402 through the femtocell signaling interface, wherein the first connection establishment procedure follows a certain cellular radio access network standards. In another embodiment of the invention, the first connection establishment procedure between the user equipment entity 402 and the femtocell signaling entity 406 may be a signaling procedure for 3GPP Uu reference point (for 3GPP Home NodeB access network), a procedure for 3GPP LTE-Uu reference point (for 3GPP Home eNodeB access network), or a procedure for the U reference point of a CDMA network, to name a few.

Then, in step S414, the femtocell signaling entity 406 performs a second connection establishment procedure with the cellular core network 408. In detail, the controller sub-system of the femtocell signaling entity 406 performs the second connection establishment procedure with the cellular core network entity 408. In another embodiment, the second connection establishment procedure between the femtocell signaling entity 406 and the cellular core network entity 408 may be a signaling procedure for 3GPP Iuh reference point (for 3GPP Home NodeB access network), a procedure for 3GPP S1 reference point (for 3GPP Home eNodeB access network), to name a few.

After the user equipment entity 402 performs the first connection establishment procedure with the femtocell signaling entity 406, in step S416, the user equipment entity 402 performs a first security establishment procedure with the femtocell signaling entity 406. In detail, the controller sub-system of the femtocell signaling entity 406 performs the first security establishment procedure with the user equipment entity 402 through the femtocell signaling interface. In step S416, a certain enhanced cellular wireless network standard is adopted in the first security establishment procedure. In another embodiment, the first security establishment procedure of step S406 may be an enhanced signaling procedure for 3GPP Uu reference point (for 3GPP Home NodeB access network), an enhanced procedure for 3GPP LTE-Uu reference point (for 3GPP Home eNodeB access network), or an enhanced procedure for the U reference point of a code division multiple access (CDMA) network, to name a few.

After the femtocell signaling entity 406 performs the second connection establishment procedure with the cellular core network entity 408, in step S418, the femtocell signaling entity 406 performs a second security establishment procedure with the cellular core network 408. In detail, the controller sub-system of the femtocell signaling entity 406 performs the second security establishment procedure with the cellular core network entity 408 through the wide area network interface. In another embodiment, the second security establishment procedure performed between the femtocell signaling entity 406 and the cellular core network entity 408 may be an enhanced signaling procedure for 3GPP Iuh reference point (for 3GPP Home NodeB access network), an enhanced procedure for 3GPP S1 reference point (for 3GPP Home eNodeB access network), to name a few.

It is worth noting that, in steps S416 and S418, a set of predetermined security parameters can be used to establish a safe control channel. The set of predetermined security parameters can include a Wi-Fi access point service set identifier (SSID) and Wi-Fi security parameters. The Wi-Fi access point service set identifier and the Wi-Fi security parameters may be dynamically determined by the controller sub-system of the femtocell signaling entity 406 or the cellular core network 408, and then be delivered to the user equipment entity 402 in step S416. In a certain embodiment of the invention, a default access point service set identifier may be already provisioned to both the user equipment entity 402 and the controller sub-system of the femtocell signaling entity 406, but it is to be understood that the invention is not limited to the disclosed embodiments.

In various embodiments of the invention, the Wi-Fi security parameters may comprise parameters to support WPA, WPA2, WPA-Personal, WPA-Enterprise, and/or Wi-Fi Passpoint.

Figure 5:
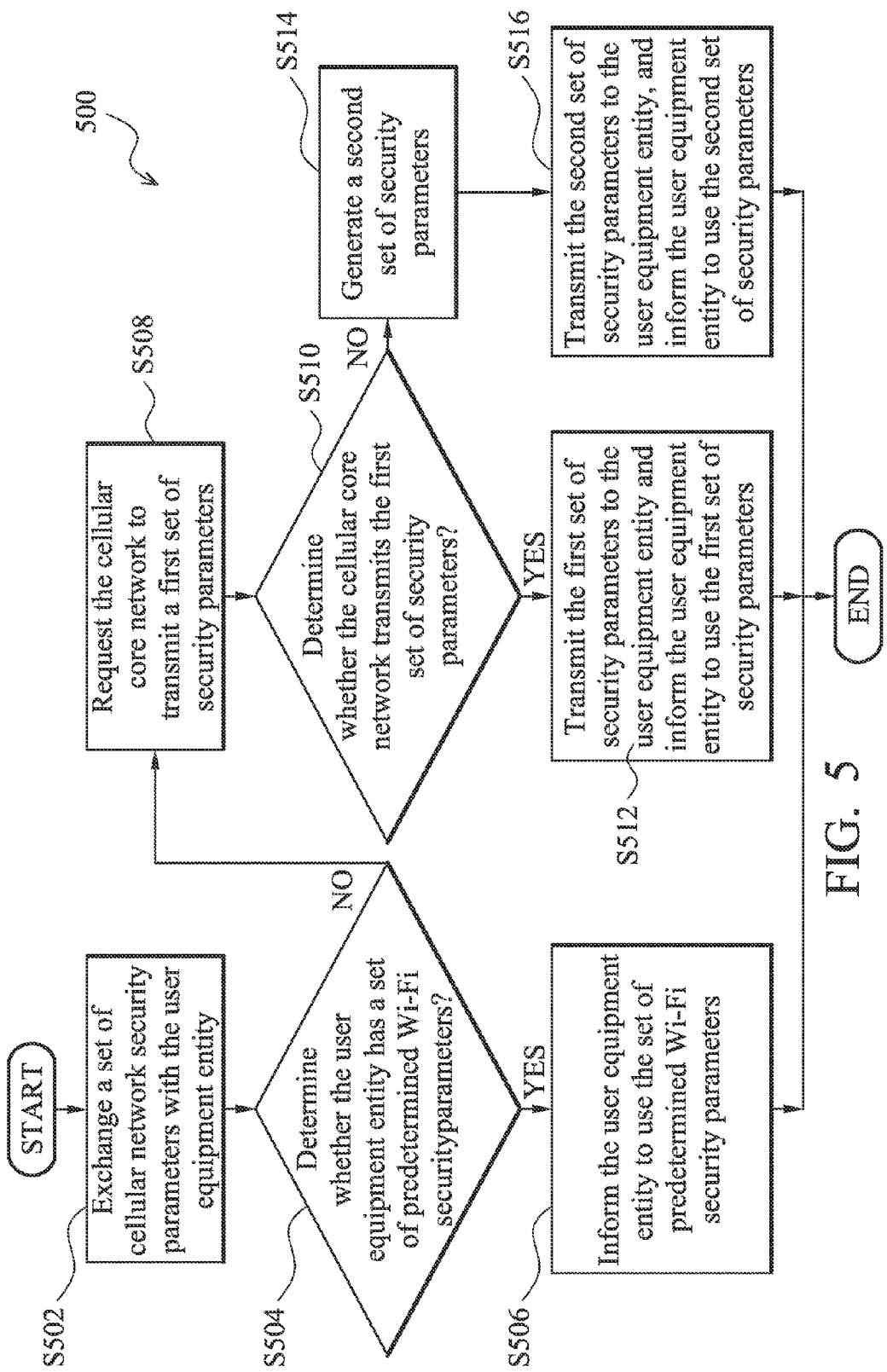
FIG. 5 is a flow diagram illustrating that the controller sub-system of the femtocell signaling entity in FIG. 4 determines a set of security parameters according to an embodiment of the present invention.

FIG. 5 is a flow diagram 500 illustrating that the controller sub-system of the femtocell signaling entity 406 in FIG. 4 determines a set of security parameters according to an embodiment of the present invention.

First, in step S502, the controller sub-system exchanges a set of cellular network security parameters with the user equipment entity through the femtocell signaling interface. Then, in step S504, the controller sub-system determines whether the user equipment entity has a set of predetermined Wi-Fi security parameters. When the controller sub-system determines the user equipment entity has the set of predetermined Wi-Fi security parameters ("yes" in step S504), in step S506, the controller sub-system informs the user equipment entity to use the set of predetermined Wi-Fi security parameters through the femtocell signaling interface, and the flow is finished.

When the controller sub-system determines the user equipment entity does not have the set of predetermined Wi-Fi security parameters ("No" in step S504), in step S508, the controller sub-system requests the cellular core network to transmit a first set of security parameters through the wide area network interface. Then, in step S510, the controller sub-system determines whether the cellular core network transmits the first set of security parameters. When the controller sub-system determines that the cellular core network transmits the first set of security parameters, it means that the controller sub-system receives the first set of security parameters ("Yes" in step S510), in step S512, the controller sub-system transmits the first set of security parameters to the user equipment entity through the femtocell signaling interface and informs the user equipment entity to use the first set of security parameters, and the flow is finished. When the controller sub-system determines that the cellular core network does not transmit the first set of security parameters, it means that the controller sub-system does not receive the first set of security parameters ("No" in step S510), in step S514, the controller sub-system generates a second set of security parameters. Finally, in step S516, the controller sub-system transmits the second set of security parameters to the user equipment entity through the femtocell signaling interface, and informs the user equipment entity to use the second set of security parameters, and the flow is finished.

Referring to FIG. 4, after the user equipment entity 402 and the femtocell signaling entity 406 perform the first security establishment procedure, in step S420, the femtocell signaling entity 406 and the user equipment entity 402 perform a first Wi-Fi bearer setup procedure. In detail, the controller sub-system of the femtocell signaling entity 406 performs the first Wi-Fi bearer setup procedure through the femtocell signaling interface. In step S420, a certain enhanced cellular wireless network standard is adopted in the first Wi-Fi bearer setup procedure. In another embodiment, the first Wi-Fi bearer setup procedure of step S420 may be an enhanced signaling procedure for 3GPP Uu reference point (for 3GPP Home NodeB access network), an enhanced procedure for 3GPP LTE-Uu reference point (for 3GPP Home eNodeB access network), or an enhanced procedure for the U reference point of a CDMA network, to name a few.

After the femtocell signaling entity 406 and the cellular core network entity 408 perform the second security establishment procedure, in step S422, the femtocell signaling entity 406 and the cellular core network entity 408 perform a second Wi-Fi bearer setup procedure. In detail, the controller sub-system of the femtocell signaling entity 406 performs the second Wi-Fi bearer setup procedure through the wide area network interface. In another embodiment, the second Wi-Fi bearer setup procedure performed between the femtocell signaling entity 406 and the cellular core network entity 408 may be an enhanced signaling procedure for 3GPP Iuh reference point (for 3GPP Home NodeB access network), an enhanced procedure for 3GPP S1 reference point (for 3GPP Home eNodeB access network), to name a few.

In various embodiments of the invention, the first Wi-Fi bearer setup procedure and the second Wi-Fi bearer setup procedure may include new bearer types for Wi-Fi data transmission channels and a modified bearer setup procedure in the radio interface. In the ordinary femtocell network, user data packets as well as the signaling packets are transferred on data/signaling bearers of the associated cellular network radio interface. However, in the invention, the user data packets are transferred on the Wi-Fi channel. For this reason, new data bearer types for the Wi-Fi data transmission channels should be defined for the first and second Wi-Fi bearer setup procedures. In some embodiments, the new bearer types for the Wi-Fi data transmission channels may comprise 802.11b data bearer, 802.11a data bearer, 802.11g data bearer, 802.11n1 data bearer, 802.11n2 data bearer, and 802.11ac data bearer. Each data type may be associated with a set of quality of service (QoS) parameters which are defined in the associated cellular network specifications. The first Wi-Fi bearer setup procedure and the second Wi-Fi bearer setup procedure in step S420 and step S422 will be described in detail in FIG. 6.

Figure 6:
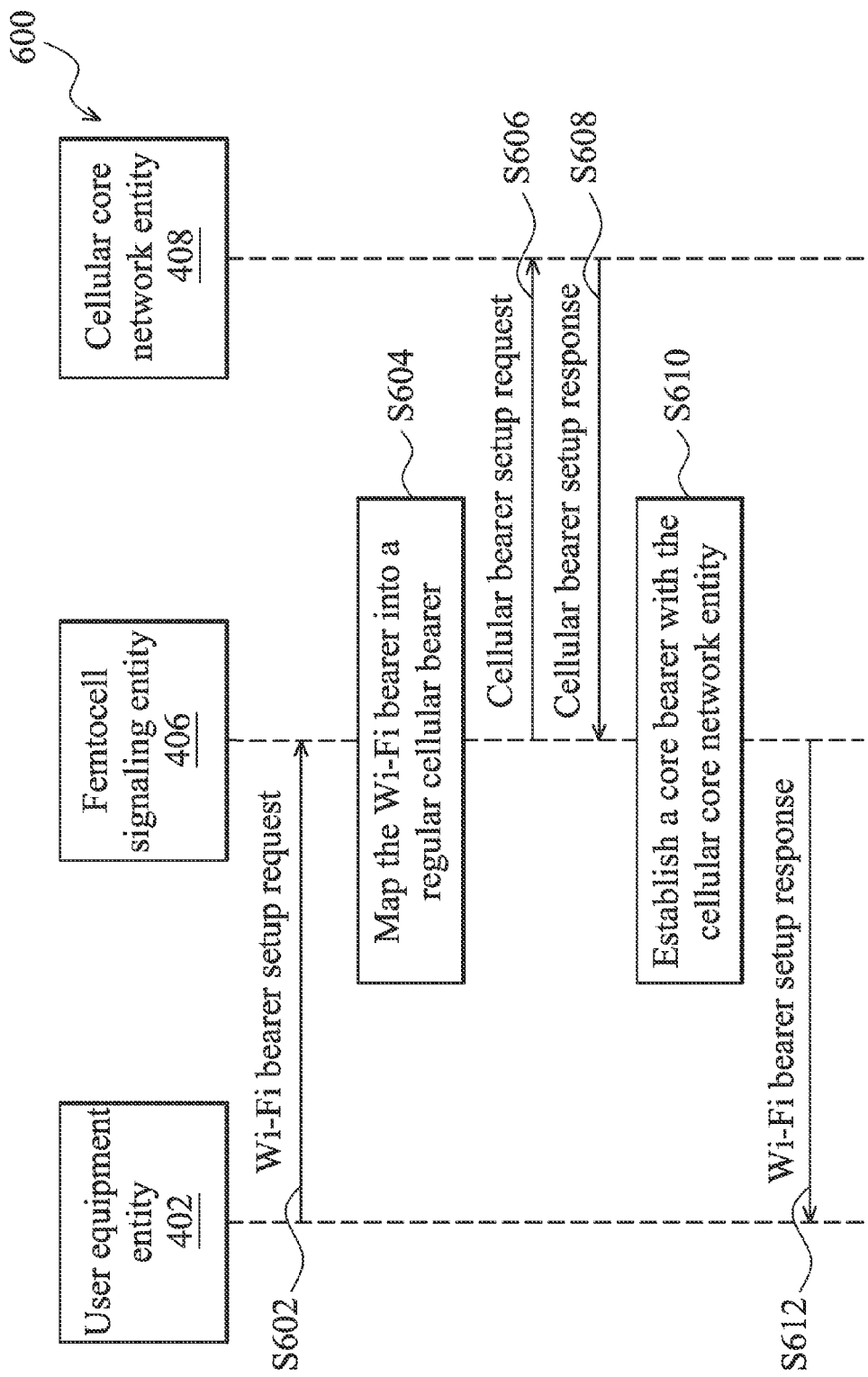
FIG. 6 is a flow diagram illustrating the Wi-Fi bearer setup procedure according to an embodiment of the present invention.

FIG. 6 is a flow diagram 600 illustrating the Wi-Fi bearer setup procedure according to an embodiment of the present invention. As shown in FIG. 6, the flow diagram 600 includes the user equipment entity 402, the femtocell signaling entity 406 and the cellular core network entity 408. The related entities in FIG. 6 are the same as the illustration of FIG. 4 described above, so the details related to the entities in FIG. 6 will be omitted.

First, in step 602, the user equipment entity 402 transmits a Wi-Fi bearer setup request to the controller sub-system of the femtocell signaling entity 406. In step S604, after the controller sub-system of the femtocell signaling entity 406 receives the Wi-Fi bearer setup request through the femtocell signaling interface, the controller sub-system of the femtocell signaling entity 406 maps the Wi-Fi bearer into a regular cellular bearer. Then, in step S606, the controller sub-system of the femtocell signaling entity 406 transmits a cellular bearer setup request to the cellular core network entity 408 through the wide area network interface. In step S608, after receiving the cellular bearer setup request, the cellular core network entity 408 transmits a cellular bearer setup response to the controller sub-system of the femtocell signaling entity 406. In step S610, the controller sub-system of the femtocell signaling entity 406 establishes a core bearer with the cellular core network entity 408. Finally, in step S612, the controller sub-system of the femtocell signaling entity 406 transmits a Wi-Fi bearer setup response to the user equipment entity 402 through the femtocell signaling interface to inform the user equipment entity 402 the first Wi-Fi bearer setup procedure and the second Wi-Fi bearer setup procedure are finished.

Referring to FIG. 4, after the first Wi-Fi bearer setup procedure in step S420 and the second Wi-Fi bearer setup procedure in step S422 are finished, in step S424, the femtocell signaling entity 406 and the Wi-Fi access point entity 404 perform a security information exchange procedure. The security information exchange procedure is that the femtocell signaling entity 406 transmits the security parameters which are generated from step S416 and step S418 (the Wi-Fi access point service set identifier (SSID) and the Wi-Fi security parameters) to the Wi-Fi access point entity 404. After receiving the security parameters, the Wi-Fi access point entity 404 configures its wireless interface with the security parameters. In another embodiment, the security parameters may be generated from the Wi-Fi access point entity 404, and be transmitted to the femtocell signaling entity 406 in a certain condition, and not be limited to be generated from the femtocell signaling entity 406.

It is worth noting that when the Wi-Fi access point entity 404 of FIG. 4 represents the Wi-Fi access point radio access interface 204 of FIG. 2, the security information exchange procedure of step S424 may be only a software process communication in the Wi-Fi access point 200. When the Wi-Fi access point entity 404 of FIG. 4 represents the Wi-Fi access point partner 320 of FIG. 3, the Wi-Fi access point partner 320 performs the security information exchange procedure through the local area network interface 315 and the local area network interface 323. In another embodiment, the security information exchange procedure of step S424 may be executed before, after, or concurrently with the first Wi-Fi bearer setup procedure of step S420, depending on the specific realization of the invention. The details of the security information exchange procedure will be described in FIG. 7.

FIG. 7 is a flow diagram 700 illustrating that the Wi-Fi access point 310 and the Wi-Fi access point partner 320 of FIG. 3 perform the security information exchange procedure according to an embodiment of the present invention with reference to FIG. 3.

First, in step S702, the Wi-Fi access point 310 transmits a security channel setup request to the Wi-Fi access point partner 320 through the local area network interface 315. Then, after receiving the security channel setup request through the local area network interface 323, in step S704, the Wi-Fi access point partner 320 transmits a security channel setup response to the Wi-Fi access point 310. In step S706 and step S708, the Wi-Fi access point 310 and the Wi-Fi access point partner 320 establish corresponding secure channels, respectively. Next, in step S710, the Wi-Fi access point 310 transmits a set of secure parameters to the Wi-Fi access point partner 320 through the local area network interface 315. Finally, after receiving the set of secure parameters through the local area network interface 323, in step S712, the Wi-Fi access point partner 320 transmits a secure parameter acknowledgement to the Wi-Fi access point 310.

Referring to FIG. 4, after the security information exchange procedure of step S424 is finished, in step S426, both the Wi-Fi access point entity 404 and the user equipment entity 402 can use the same set of security parameters to perform a data transmission channel establishment procedure to establish a data transmission channel, wherein the data transmission channel establishment procedure follows the Wi-Fi standard for a Wi-Fi client to associate and authenticate with a Wi-Fi AP.

FIG. 8 is a flow diagram 800 illustrating that the user equipment entity is connected to the Wi-Fi access point to establish a data transmission channel according to an embodiment of the present invention with reference to FIG. 1 to FIG. 4.

As shown in FIG. 8, in step S802, the user equipment may search a suitable Wi-Fi access point on a premise. In step S804, the user equipment determines whether there is a suitable Wi-Fi access point on the premise. When the user device does not find the suitable Wi-Fi access point ("No" in step S804), and then the flow goes back to step S802, and the user equipment continues to search for the suitable Wi-Fi access point. When the user equipment finds the suitable Wi-Fi access point ("Yes" in step S804), in step S806, the user equipment and the Wi-Fi access point perform the first security establishment to obtain a set of security parameters, and establish a security channel. In detail, the step S806 describes the step S412, step S416 and step S420 of FIG. 4. Then, in step S808, the user equipment uses the set of security parameters transmitted from the Wi-Fi access point to set a Wi-Fi interface. Finally, in step S810, the user equipment is connected to the Wi-Fi access point through the Wi-Fi interface, and establishes a data transmission channel.

Therefore, many advantages can be achieved by using the Wi-Fi access point and system in this invention: (1) because only the femtocell signaling interface is used in the Wi-Fi access point of the invention, the cost of the Wi-Fi access point of the invention is relatively low compared with the regular femtocell interface; (2) The interference to the macro/mini/micro cells of the cellular network can be reduced significantly since the Wi-Fi access point in the invention needs only a narrow bandwidth for signaling. In the long term evolution (LTE) release 8 network, for example, the regular femtocell may need 10 or 20 MHz bandwidth for both signaling and user data packets. The Wi-Fi access point in the invention can work well with only 1.4 or 3 MHz bandwidth. (3) It does not need additional Wi-Fi configurations on the mobile devices to securely access the Wi-Fi access point, since most of the signaling exchange is on the femtocell signaling interface. (4) The mobile devices will no longer be searching for the available Wi-Fi access points all the time to find a suitable Wi-Fi access point to offload user data. This will be more power-efficient for a mobile device. (5) The operators can fully control (for example, policy enforcement, charging, etc) the Wi-Fi offloading of data traffic.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A Wi-Fi access point (Wi-Fi AP), comprising:
   a femtocell signaling interface;
   a wide area network (WAN) interface;
   a Wi-Fi access point radio access interface; and
   a controller sub-system, coupled to the femtocell signaling interface, the wide area network interface and the Wi-Fi AP radio access interface;
   wherein the controller sub-system performs a first connection establishment procedure with a user equipment through the femtocell signaling interface, and performs a second connection establishment procedure with a cellular core network (CN) through the wide area network interface; the controller sub-system performs a first security establishment procedure with the user equipment through the femtocell signaling interface, and performs a second security establishment procedure with the cellular core network by using the wide area network interface; the controller sub-system obtains a set of security parameters according to the first security establishment and the second security establishment; the controller sub-system further performs a first Wi-Fi bearer setup procedure and a second Wi-Fi bearer setup procedure with the user equipment and the cellular core network through the femtocell signaling interface and the wide area network interface, respectively; the controller sub-system performs a security information exchange procedure with the Wi-Fi access point radio access interface through the femtocell signaling interface; and the controller sub-system establishes a data transmission channel with the user equipment through the Wi-Fi access point radio access interface according to the set of security parameters.

2. The Wi-Fi access point as claimed in claim 1, wherein the first security establishment and the second security establishment further comprise:
   the controller sub-system determining whether the Wi-Fi access point has a set of predetermined security parameters; and
   the controller sub-system transmitting the set of predetermined security parameters to the user equipment through the femtocell signaling interface when the controller sub-system determines the Wi-Fi access point has the set of predetermined security parameters.

3. The Wi-Fi access point as claimed in claim 2, wherein the first security establishment and the second security establishment further comprise:
the controller sub-system requests the cellular core network to transmit a first set of security parameters through the wide area network interface when the controller sub-system determines the Wi-Fi access point does not have the set of predetermined security parameters;
the controller sub-system determines whether the cellular core network transmits the first set of security parameters; and
the controller sub-system transmits the first set of security parameters to the user equipment through the femtocell signaling interface when the controller sub-system determines the cellular core network transmits the first set of security parameters to the user equipment.

4. The Wi-Fi access point as claimed in claim 3, wherein the first security establishment and the second security establishment further comprise:
the controller sub-system generates a second set of security parameters when the controller sub-system determines the cellular core network does not transmit the first set of security parameters to the user equipment; and
the controller sub-system transmits the second set of security parameters to the user equipment through the femtocell signaling interface.

5. The Wi-Fi access point as claimed in claim 4, wherein the set of security parameters is one of the set of predetermined security parameters, the first set of security parameters, and the second set of security parameters, and at least comprises:
a Wi-Fi access point service set identifier (SSID); and
Wi-Fi security parameters.

6. The Wi-Fi access point as claimed in claim 1, wherein the first Wi-Fi bearer setup procedure and the second Wi-Fi bearer setup procedure further comprise:
the user equipment transmits a Wi-Fi bearer setup request to the controller sub-system;
the controller sub-system receives the Wi-Fi bearer setup request through the femtocell signaling interface;
the controller sub-system maps a Wi-Fi bearer into a regular cellular bearer;
the controller sub-system transmits a cellular bearer setup request to the cellular core network through the wide area network interface, and receives a cellular bearer setup response transmitted from the cellular core network;
the controller sub-system establishes a core bearer with the cellular core network; and
the controller sub-system transmits a Wi-Fi bearer setup response to the user equipment through the femtocell signaling interface to inform the user equipment the first Wi-Fi bearer setup procedure and the second Wi-Fi bearer setup procedure are finished.

7. A system of Wi-Fi access points (Wi-Fi AP), comprising:
a Wi-Fi access point, comprising:
a femtocell signaling interface;
a wide area network (WAN) interface;
a first local area network (LAN) interface;
a Wi-Fi access point radio access interface;
a first controller sub-system, coupled to the femtocell signaling interface, the wide area network interface, the first local area network interface and the Wi-Fi access point radio access interface; and a Wi-Fi access point partner, coupled to the Wi-Fi access point through a network interface, comprising:
a Wi-Fi access point radio sub-system;
a second local area network (LAN) interface;
a femtocell signaling partner, configured to establish a partnership relation between the Wi-Fi access point and the Wi-Fi access point partner;
a second controller sub-system, coupled to the second local area network interface and the femtocell signaling partner;
wherein the first controller sub-system performs a first connection establishment procedure with a user equipment through the femtocell signaling interface, and performs a second connection establishment procedure with a cellular core network (CN) through the wide area network interface;
the first controller sub-system performs a first security establishment with the user equipment through the femtocell signaling interface, and performs a second security establishment with the cellular core network through the wide area network interface;
the first controller sub-system obtains a set of security parameters according to the first security establishment and the second security establishment;
the first controller sub-system further performs a first Wi-Fi bearer setup procedure and a second Wi-Fi bearer setup procedure with the user equipment and the cellular core network through the femtocell signaling interface and the wide area network interface, respectively;
the first controller sub-system performs a security information exchange procedure with the second controller sub-system through the first local area network interface; and
the second controller sub-system establishes a data transmission channel with the user equipment through the Wi-Fi access point radio sub-system according to the set of security parameters.

8. The system as claimed in claim 7, wherein the first security establishment and the second security establishment further comprise:
the first controller sub-system determines whether the Wi-Fi access point has a set of predetermined security parameters; and
the first controller sub-system transmits the set of predetermined security parameters to the user equipment through the femtocell signaling interface when the first controller sub-system determines the Wi-Fi access point has the set of predetermined security parameters.

9. The system as claimed in claim 8, wherein the first security establishment and the second security establishment further comprise:
the first controller sub-system requests the cellular core network to transmit a first set of security parameters through the wide area network interface when the first controller sub-system determines the Wi-Fi access point does not have the set of predetermined security parameters;
the first controller sub-system determines whether the cellular core network transmits the first set of security parameters; and
the first controller sub-system transmits the first set of security parameters to the user equipment through the femtocell signaling interface when the first controller sub-system determines the cellular core network transmits the first set of security parameters to the user equipment.

10. The system as claimed in claim 9, wherein the first security establishment and the second security establishment further comprise:
- the first controller sub-system generates a second set of security parameters when the first controller sub-system determines the cellular core network does not transmit the first set of security parameters to the user equipment; and
- the first controller sub-system transmits the second set of security parameters to the user equipment through the femtocell signaling interface.

11. The system as claimed in claim 9, wherein the set of security parameters is one of the set of predetermined security parameters, the first set of security parameters, and the second set of security parameters, and comprises at least:
- a Wi-Fi access point service set identifier (SSID); and
- Wi-Fi security parameters.

12. The system as claimed in claim 7, wherein the first Wi-Fi bearer setup procedure and the second Wi-Fi bearer setup procedure further comprise:
- the user equipment transmitting a Wi-Fi bearer setup request to the first controller sub-system;
- the first controller sub-system receiving the Wi-Fi bearer setup request through the femtocell signaling interface;
- the first controller sub-system mapping a Wi-Fi bearer into a regular cellular bearer;
- the first controller sub-system transmitting a cellular bearer setup request to the cellular core network through the wide area network interface, and receiving a cellular bearer setup response transmitted from the cellular core network;
- the first controller sub-system establishing a core bearer with the cellular core network; and
- the first controller sub-system transmitting a Wi-Fi bearer setup response to the user equipment through the femtocell signaling interface to inform the user equipment the first Wi-Fi bearer setup procedure and the second Wi-Fi bearer setup procedure are finished.

13. The system as claimed in claim 7, wherein the security information exchange procedure comprises:
- the first controller sub-system transmitting a security channel setup request to the second controller sub-system through the first local area network interface;
- the second controller sub-system transmitting a security channel setup response to the first controller sub-system after receiving the security channel setup request through the second local area network interface;
- the first controller sub-system and the second controller sub-system respectively establishing a secure channel;
- the first controller sub-system transmitting the set of security parameters to the second controller sub-system through the first local area network interface; and
- the second controller sub-system transmitting a security parameter acknowledgement to the first controller sub-system after receiving the set of security parameters through the second local area network interface.

* * * * *